United States Patent
Yu et al.

(10) Patent No.: US 12,051,089 B2
(45) Date of Patent: Jul. 30, 2024

(54) MEDIA CONTENT PLACEMENT METHOD AND RELATED APPARATUS

(71) Applicant: TENCENT TECHNOLOGY (SHENZHEN) COMPANY LIMITED, Guangdong (CN)

(72) Inventors: Ziqiang Yu, Guangdong (CN); Xue Luo, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 16 days.

(21) Appl. No.: 17/680,540

(22) Filed: Feb. 25, 2022

(65) Prior Publication Data
US 2022/0180397 A1     Jun. 9, 2022

Related U.S. Application Data

(63) Continuation of application No. PCT/CN2020/127404, filed on Nov. 9, 2020.

(30) Foreign Application Priority Data

Feb. 27, 2020   (CN) .......................... 202010123971.0

(51) Int. Cl.
*G06Q 30/02*        (2023.01)
*G06Q 30/0251*     (2023.01)
(Continued)

(52) U.S. Cl.
CPC .......... *G06Q 30/0251* (2013.01); *G06T 3/40* (2013.01); *G06T 7/70* (2017.01); *G06V 10/25* (2022.01);
(Continued)

(58) Field of Classification Search
CPC ...... G06T 7/536; G06V 20/41; H04N 5/2723; G09G 3/2044; G11B 27/28
See application file for complete search history.

(56) References Cited

U.S. PATENT DOCUMENTS 9,852,677 B2 *  12/2017  Zhang ................. G09G 3/2044
2002/0100042 A1    7/2002  Khoo et al.
(Continued)

FOREIGN PATENT DOCUMENTS

CN       103974126 A     8/2014
CN       105955042 A     9/2016
(Continued)

OTHER PUBLICATIONS

Law, Hei, and Jia Deng. "Cornernet: Detecting objects as paired keypoints." Proceedings of the European conference on computer vision (ECCV). 2018.
(Continued)

*Primary Examiner* — Saba Dagnew
(74) *Attorney, Agent, or Firm* — ArentFox Schiff LLP

(57) ABSTRACT

Aspects of the disclosure are directed to a media content placement method and a related apparatus. According to the method, a target video and first media content can be obtained, and video frames of the target video are inputted into a first model for corner tracking to obtain a plurality of target corners. Additionally, a target region in the video frames can be determined according to the target corners, and the first media content can then be placed into the target region. In this way, the automatic placement of the media content is realized. The target region in the video frames can be determined through the target corners outputted by the first model, thereby ensuring the accuracy of the placement process. In addition, the whole process does not require manual replacement, which improves the efficiency of media content placement.

20 Claims, 12 Drawing Sheets

(51) Int. Cl.
*G06T 3/40* (2024.01)
*G06T 7/70* (2017.01)
*G06V 10/25* (2022.01)

(52) U.S. Cl.
CPC ............. *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 2009/0079871 | A1* | 3/2009 | Hua | G11B 27/28 348/584 |
| 2011/0321084 | A1* | 12/2011 | Takahashi | H04N 5/2723 725/32 |
| 2013/0011071 | A1* | 1/2013 | Deng | G06V 20/40 382/195 |
| 2014/0359656 | A1* | 12/2014 | Banica | H04N 21/234 725/32 |
| 2017/0278289 | A1* | 9/2017 | Marino | G06T 7/536 |
| 2019/0075339 | A1 | 3/2019 | Smith | |
| 2019/0197703 | A1* | 6/2019 | Wang | G06V 20/41 |
| 2020/0374600 | A1 | 11/2020 | Xu et al. | |

FOREIGN PATENT DOCUMENTS

| | | |
|---|---|---|
| CN | 109996107 A | 7/2019 |
| CN | 110163640 A | 8/2019 |
| CN | 110708593 A | 1/2020 |
| CN | 111372122 A | 7/2020 |

OTHER PUBLICATIONS

Wang, Qiang, et al. "Fast online object tracking and segmentation: A unifying approach." Proceedings of the IEEE/CVF conference on Computer Vision and Pattern Recognition. 2019.

Search Report issued in corresponding application PCT/CN2020/127404 (with English translation).

* cited by examiner

Before dithering      Advertising material

Before dithering      After dithering

Before dithering      After dithering

MEDIA CONTENT PLACEMENT METHOD AND RELATED APPARATUS

RELATED APPLICATION

This application is a continuation of International Application No. PCT/CN2020/127404, filed on Nov. 9, 2020, which claims priority to Chinese Patent Application No. 2020101239710, entitled "MEDIA CONTENT PLACEMENT METHOD, MODEL TRAINING METHOD, AND RELATED APPARATUSES" filed on Feb. 27, 2020. The entire disclosures of the prior applications are hereby incorporated by reference in their entirety.

FIELD OF THE TECHNOLOGY

This application relates to the field of computer technologies, including a media content placement technology.

BACKGROUND OF THE DISCLOSURE

With the development of Internet technologies, more media content exists where video-in, as a soft form of advertising placement, is often used to place media content, such as advertisements, into a video. Compared with conventional advertising, video-in has the advantages of high reach rate, low cooperation risk, and budget saving. Through the video-in technology, advertisers can place advertisements in relevant interfaces or middle and later stages of content according to the popularity of media content, thereby reducing the risk of advertising investment.

Generally, during shooting of a video, advertising content may be determined and shots are reserved, or an advertising board is placed in a shooting scene that is an insertion point is preset, and an advertising material is then manually placed frame by frame subsequently.

However, in a scenario where a large amount of media content is to be exposed, in order to ensure the exposure rate of relevant advertising positions, media content generally needs to be placed in a large quantity of videos. The foregoing media content placement technique requires manual replacement frame by frame, which affects the efficiency and accuracy of media content placement.

SUMMARY

Aspects of the present disclosure can provide a media content placement method, which can effectively avoid low placement efficiency and instability caused by manual replacement frame by frame, and improve the efficiency and accuracy of the media content placement process.

In an embodiment, the disclosure provides a media content placement method. The method can include obtaining, by processing circuitry, a target video and first media content, the target video including a plurality of video frames, and inputting, by processing circuitry, the video frames into a first model for corner tracking to obtain a plurality of target corners, the first model including a corner branch and an image branch, the corner branch being configured for determining candidate corners in the video frames, and the image branch being configured for extracting the target corners from the candidate corners. The method can further include determining, by processing circuitry, a target region in the video frames based on the target corners, and placing, by processing circuitry, the first media content into the target region.

In further embodiments, the method inputting the video frames into a first model further can further include inputting the video frames into the first model and determining the candidate corners in the video frames through the corner branch, mapping the candidate corners to the video frames through the image branch to obtain a candidate region, and determining the plurality of target corners that satisfy a preset condition from the candidate corners, the preset condition being determined based on a correspondence between the candidate region and a preset region, the preset region being a media content placement region marked in the video frames.

In an alternative embodiment, the disclosure describes a media content placement apparatus that can include an obtaining circuit that is configured to obtain a target video and first media content, the target video including a plurality of video frames, and a tracking circuit that is configured to input the video frames into a first model for corner tracking to obtain a plurality of target corners, the first model including a corner branch and an image branch, the corner branch being configured for determining candidate corners in the video frames, and the image branch being configured for extracting the target corners from the candidate corners. The apparatus can further include a determining circuit that is configured to determine a target region in the video frames based on the target corners, and a placement circuit that is configured to place the first media content into the target region.

In another embodiment, the disclosure provides a non-transitory computer-readable storage medium that stores instructions that, when run on a computer, cause the computer to perform a media content placement method. The method can include obtaining a target video and first media content, the target video including a plurality of video frames, and inputting the video frames into a first model for corner tracking to obtain a plurality of target corners, the first model including a corner branch and an image branch, the corner branch being configured for determining candidate corners in the video frames, and the image branch being configured for extracting the target corners from the candidate corners. The method can further include determining a target region in the video frames based on the target corners, and placing the first media content into the target region.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

Figure 1:
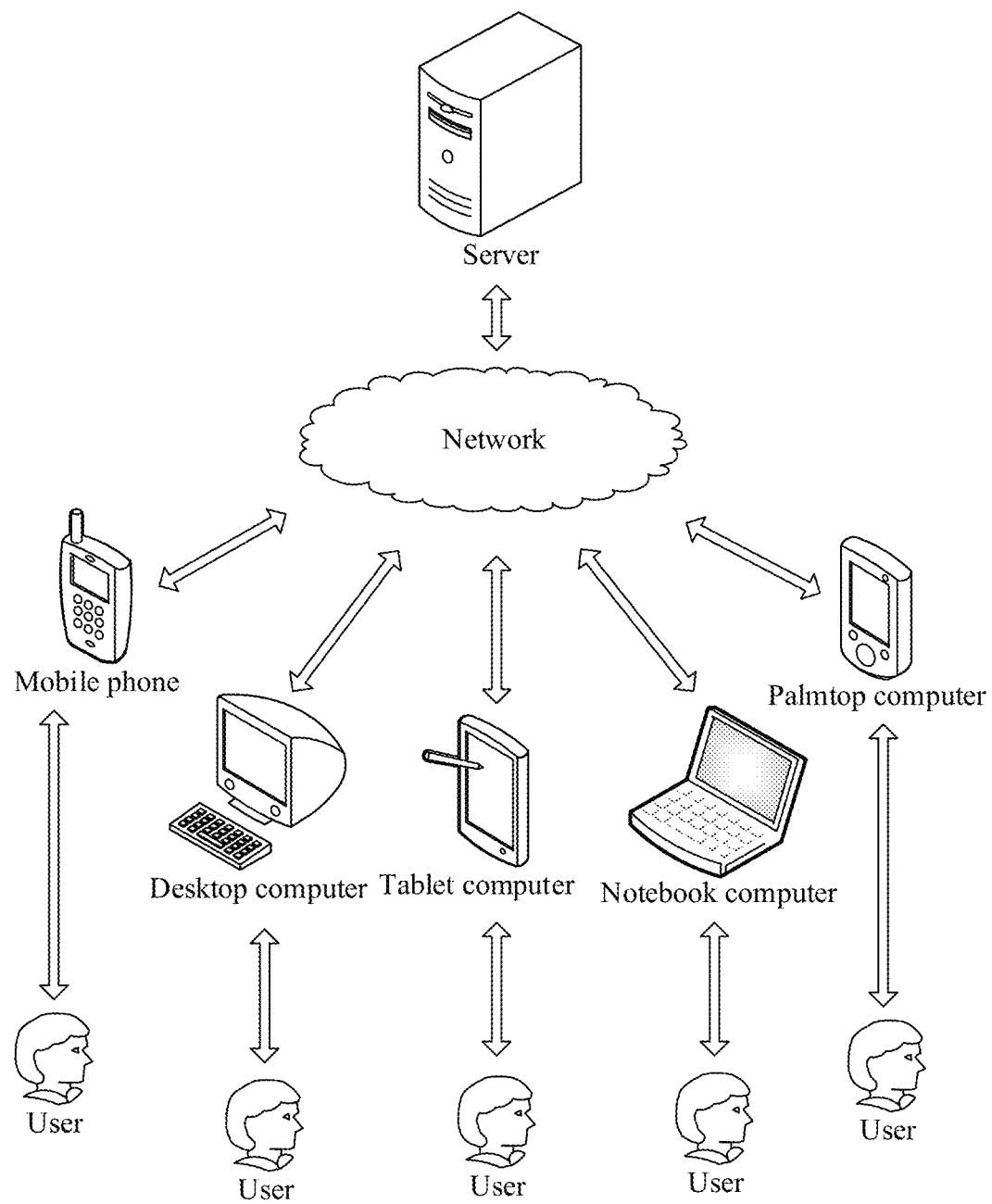
FIG. 1 is a network architectural diagram of operation of a media content placement system.

At the outset, select terms that may appear in the exemplary embodiments of this application are explained below.

Video-In is a form of placing advertisements in videos in later stages.

Video Frame is a still image that is used in a video that is formed by a series of video frames. Videos are generally measured in frames per second (FPS). A dynamic image is created when a series of video frames are played in sequence. For example, a video created at 30 FPS essentially plays 30 still images per second.

Corner refers to an intersection of two edge straight lines of a target region (for example, a region in a video frame where an advertising material is inserted). For example, corners of a rectangular flat advertisement refer to points of the four corners on the region where the advertising material is inserted.

Corner tracking is to determine an intersection of two edge straight lines of a target region.

Perspective transformation is to project a picture to a new viewing plane.

Dithering is to analyze a color of a picture and imitate an overall style and hues such as a Japanese style and retro.

Hue loss is mainly manifested in some differences in image color, brightness, texture, and material.

Content loss is used in the context of image content which is used in this application for representing pixel information of the image, and may specifically represent a structure, texture, edges, and the like of the image. The content loss is used for representing a numerical difference between pixels at the same location in different images.

Siamese is a network model commonly used for target tracking. Most of the current target tracking tasks are based on the improvement of a Siamese network architecture.

SiamCorner is a network model obtained based on Siamese improvement provided in this application, which can be used for corner tracking.

VGG19 is an image recognition convolutional network. The first few layers thereof use 3*3 convolution kernels to increase the depth of the network, a quantity of neurons in each layer is sequentially reduced by max pooling, and the last three layers are two fully connected layers including 4096 neurons and one softmax layer. VGG19 has a total of 19 layers, and in this application, pre-training model parameters of VGG19 trained based on ImageNet (a data set including tens of millions of pictures) are used for hue transfer.

Gram matrix is an eccentric covariance matrix between features, that is, a covariance matrix without mean subtraction. In features, each number comes from the convolution of a specific filter at a specific position. Therefore, each number represents the strength of a feature. A correlation between every two features, features that appear simultaneously, and features that appear contradictory can be obtained through Gram calculations. In addition, the Gram matrix includes texture information and color information of a picture.

Residual network (resnet) model is a deep convolutional network for image classification, detection, and positioning. The residual network model is easy to optimize, and the accuracy can be improved by adding considerable depth.

It is to be understood that a media content placement method provided in this application may be applied to a system or program having a media content placement function in a computer device, for example, video advertisement software. Specifically, a media content placement system may run on the network architecture shown in FIG. 1. A network architectural diagram of the media content placement system is shown in FIG. 1. The media content placement system may provide a plurality of media content placement channels corresponding to different information sources. A terminal establishes a connection with a server through a network, receives media content sent by the server, and then places and displays the relevant media content based on a target video of the terminal.

It may be understood that a variety of computer devices are shown in FIG. 1, and in an actual scenario, there may be more or fewer types of computer devices involved in a media content placement process. The specific quantity and types of computer devices depend on the actual scenario, and are not limited herein. In addition, one server is shown in FIG. 1, but in an actual scenario, there may be alternatively a plurality of servers involved, especially in a scenario where a plurality of content applications interact. The specific quantity of servers depends on the actual scenario.

The media content placement method provided in this embodiment may be alternatively performed offline, that is, without the participation of the server. In this case, the terminal may be connected with another terminal, thereby performing media content placement between the terminals.

It may be understood that the foregoing media content placement system may run on a personal mobile terminal and, for example, may further run on a server as a video advertisement application, and may be further used as a third-party device to provide media content placement, so as to obtain a processing result of media content placement of an information source. Specifically, the media content placement system may run on the foregoing device in the form of a program, may alternatively run as a system component in the foregoing device, and may be further used as a type of cloud service program. The specific operation mode depends on the actual scenario, and is not limited herein.

Figure 2:
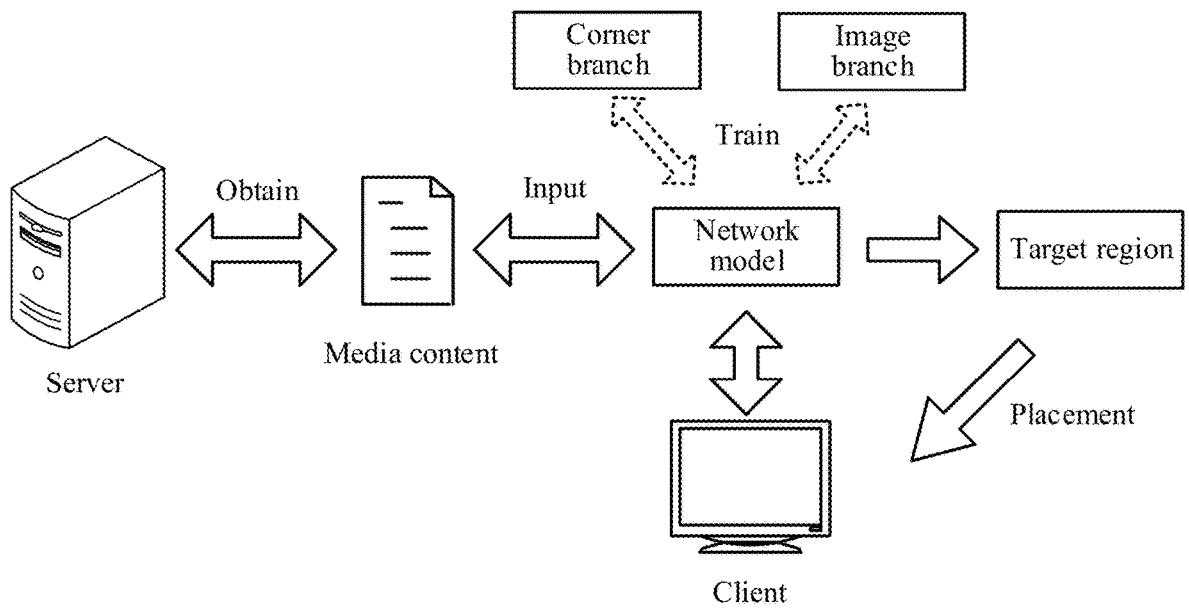
FIG. 2 is an architectural diagram of a media content placement process according to an embodiment of this application.

This application provides a media content placement method that can improve low media content placement efficiency and poor placement accuracy caused by manually replacing media content frame by frame in a video. The method is applied to a process framework of media content placement shown in FIG. 2. FIG. 2 is an architectural diagram of a media content placement process according to an embodiment of this application. The process is performed by a computer device, and the computer device may be a terminal or server. To-be-placed media content and a target video that needs to be placed with the media content are first obtained, and video frames in the target video are then inputted into a pre-trained network model (that is, a first model) to recognize target corners in the inputted video frames by using a corner branch and an image branch in the network model. Further, a target region can be determined according to the target corners in the video frames, and the to-be-placed media content is placed in the target region. The foregoing network model can more accurately recognize the target corners in the video frames by adjusting parameters of the corner branch and the image branch, thereby ensuring the accuracy of determining the target region, and realizing the automatic and efficient placement of the media content.

That the media content placement method provided in this embodiment is performed by a computer device means that the method may be performed by a terminal independently, a server independently, or by a terminal and a server jointly.

It may be understood that the method provided in this application may be written as a program as a processing logic in a hardware system, such as processing circuitry, or may be used as a media content placement apparatus, which may be integrated or externally connected to implement the processing logic. In an implementation, by using the media content placement apparatus, a target video and first media content are obtained, and video frames of the target video are inputted into a first model for corner tracking, to obtain a plurality of target corners, the first model including a corner branch and an image branch, the corner branch being configured for indicating candidate corners in the video frames, and the image branch being configured for extracting the target corners from the candidate corners. Further, a target region is determined according to the target corners, the target region being included in a region indicated by the target video, and the first media content is then placed into the target region. In this way, the automatic placement of the media content is realized. In the foregoing method, the target corners in the video frames are first determined by using the first model, and the target region for placing the media content is then accurately determined in the video frames based on the target corners determined by the first model, thereby ensuring the accuracy of media content placement. In addition, the whole process does not require manual replacement, which improves the efficiency of media content placement.

Figure 3:
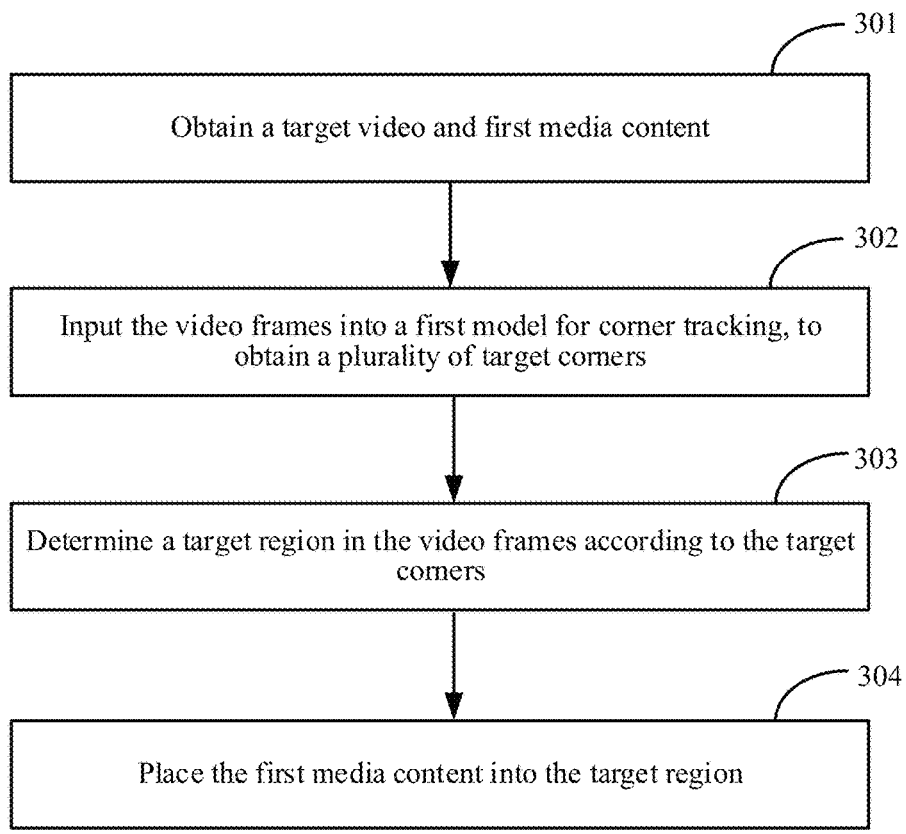
FIG. 3 is a flowchart of a media content placement method according to an embodiment of this application.

The media content placement method in this application is described below with reference to the foregoing process architecture. FIG. 3 is a flowchart of a media content placement method according to an embodiment of this application. This embodiment of this application includes at least the following steps.

In step 301, the media content placement method can obtain a target video and first media content. In this embodiment, the target video includes a plurality of video frames. The target video may be displayed on a display screen of a terminal, for example, the target video may be displayed on a screen of a mobile terminal. The target video may be alternatively displayed on a display interface of an application in the terminal, for example, the target video may be displayed on an interface of a player program in a personal terminal.

In addition, the first media content may be an advertisement. Specifically, content of the advertisement may be in the form of a picture or a video, or in another media form. The specific form depends on the actual scenario, and is not limited herein. Further, in a possible scenario, obtaining the first media content may be obtaining an advertising material to be inserted into the target video.

In step 302, the media content placement method can input the video frames into a first model for corner tracking, to obtain a plurality of target corners. In this embodiment, the first model may be determined based on a Siamese network model, that is, a network model used for target tracking. Further, considering that a difference between the video frames in the target video may be excessively small, the accuracy of tracking the target corners cannot be guaranteed only by image tracking. For example, a difference between image features of adjacent video frames is excessively small, but a position of a target region for placing the media content may have changed. In this case, when the media content is placed, a shifted placing position may occur. Therefore, in this embodiment, the Siamese network model is improved with corner tracking as a training target, which may be recorded as a SiamCorner network model. Specifically, the SiamCorner network model includes a corner branch and an image branch, the corner branch is configured for determining candidate corners in the video frames, and the image branch is configured for extracting the target corners from the candidate corners.

In a possible implementation, candidate corners in the video frames may be extracted first through the corner branch, the candidate corners are then mapped to the video frames through the image branch, to obtain a candidate region, and the plurality of target corners that satisfy a preset condition are determined from the candidate corners, the preset condition being determined based on a correspondence between the candidate region and a preset region, the preset region being a media content placement region marked in the video frames. For example, it is determined whether the candidate region includes a mark indicated by the preset region.

Optionally, the SiamCorner network model may be applied to the determination of the target corners in the same video, that is, target corners are extracted for a plurality of times from the target video by using the SiamCorner network model. In this case, a training result of the SiamCorner network model based on the target video for the first time is used for the extraction of the target corners. In another possible scenario, the SiamCorner network model performs extraction on the target video for the first time. The following describes the training process of the SiamCorner network model in this scenario.

In one aspect, a first video frame of the target video is extracted as a template frame, and a placement region is marked in the template frame. The placement region may be delineated by relevant personnel or automatically generated by the system according to historical placement regions. A video frame after the first video frame in the target video is then used as a detection frame. Each detection frame is combined with the template frame to form a video frame pair, and the video frame pairs are inputted into the SiamCorner network model to track the position of the target corners.

Specifically, through a correspondence between a training corner marked in the template frame and the template frame, corner features are extracted. The process of extracting the corner features may be performed based on the first four stages of a residual network (resnet-50). That is, a convolution kernel size of a first convolutional layer (conv1) is 7*7, a quantity of channels is 64, and a stride is 2; and a convolution kernel size of a second convolution layer (conv2) is 3*3, and a stride of a maximum pooling layer is 2. A convolution operation with convolution parameters (the convolution kernel size and the quantity of channels) of (1*1, 64; 3*3, 64; 1*1, 256)*3 is then performed; a convolution operation with convolution parameters of a third convolution layer (conv3) of (1*1, 128; 3*3, 128; 1*1, 512)*4 is performed; and a convolution operation with convolution parameters of a fourth convolution layer (conv4) of (1*1, 256; 3*3, 256; 1*1, 1024)*6 is performed.

In another aspect, image features in the detection frame may also be extracted based on the first four stages of resnet-50. For specific parameters, reference may be made to extraction parameters of the template frame, and the details are not repeated herein. The image features obtained through the detection frame and the corner features obtained through the template frame are cross-correlated to obtain a response map. The response map includes a plurality of 1*1 response windows (responses of a candidate window, row). Encoding of a corner branch and encoding of an image branch are then performed for each row, that is, the convolution operation is performed through a fifth convolution layer (conv5) and a sixth convolution layer (conv6). Specifically, Convolution parameters involved in the encoding process are shown in Table 1.

TABLE 1

Convolution parameters of image branch and corner branch

| Convolutional layer | Image branch | Corner branch |
| --- | --- | --- |
| conv5 | 1*1, 256 | 1*1, 256 |
| conv6 | 1*1, 1 | 1*1, 8 |

Further, a plurality of candidate corners may be obtained through the corner branch, the candidate corners are mapped to the detection frame through the image branch to obtain a candidate region, and it is determined whether the candidate region includes a placement region, thereby extracting the target corners from the candidate corners.

Optionally, the process of extracting the target corners from the candidate corners may be implemented based on a score branch. An output result of the score branch may indicate whether the candidate region obtained by mapping the candidate corners to the detection frame through the image branch includes the placement region, where the value is +1 if the placement region is included, and the value is −1 if the placement region is not included. Therefore, the target corners are determined by determining the magnitude of the value outputted by the score branch, that is, the candidate corners with the largest value may be selected as the target corners.

As can be seen from the foregoing embodiment, in this embodiment, a corner tracking process and a corner screening process are added based on the Siamese network model, which ensures the accuracy of the target corners, avoids the problem of inaccurate detection of the placement region due to scene changes of the target video, and improves the accuracy of the detection of the placement region.

It may be understood that the foregoing process of outputting corners is an example, that is, the quantity of target corners outputted through the first model is at least three. That is, a region formed by connecting lines of the target corners may be a triangle, may be a rectangle formed by connecting lines of four target corners, or may be a polygon formed by connecting lines of more target corners. The specific shape and the quantity of corners depend on the actual scenario and are not limited herein.

Based on the first model, an image recognition result of the video frames in the target video may be further outputted. For example, the first model is used to recognize an advertising position in the video frames. This process may be determining the target region with reference to the target corners, or determining the target region independently.

In a possible scenario, the advertising position may be determined by a part of the target corners. For example, the target corners are determined to be 4, and a part of an advertisement needs to be displayed temporarily during the placement of the advertisement, that is, placement of a pop-up advertisement. In this case, a placement region of the pop-up advertisement may be determined through three of the target corners. As can be seen, the process of determining the target region through the target corners in this embodiment is different from directly determining a placement frame. Compared with the direct determination of a placement frame, the placement of an advertisement based on corners is more flexible, which can implement cascading advertisements and improve the user experience.

The foregoing process of tracking target corners may be alternatively implemented based on corner detection algorithms such as Kitchen-Rosenfeld and Harris, or a method based on object region segmentation is used to detect corners. The details are not repeated herein.

In step 303, the media content placement method can determine a target region in the video frames according to the target corners. In this embodiment, the target region is included in a region indicated by the target video. Specifically, a shape obtained through connecting lines of the target corners may be used as the target region.

Figure 4:
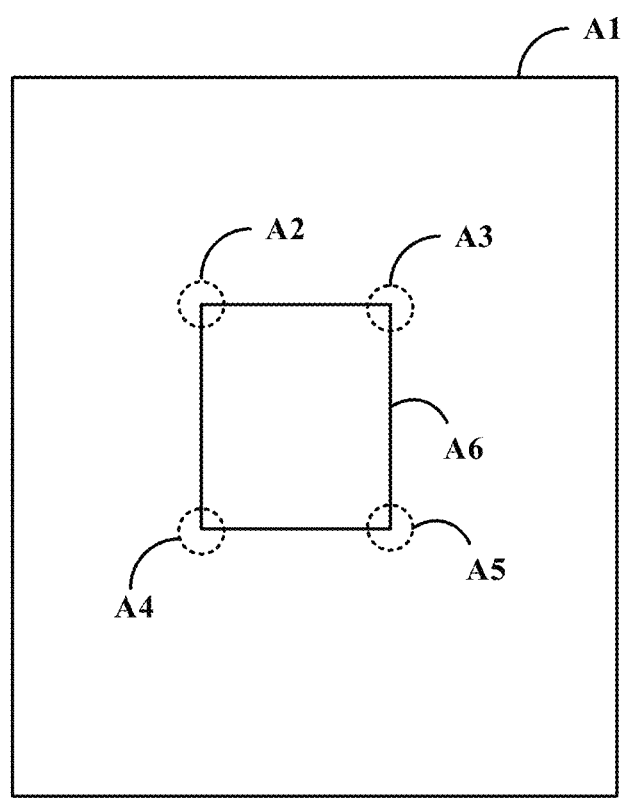
FIG. 4 is a schematic diagram of a media content placement scenario according to an embodiment of this application.

In a possible scenario, for the relationship between the region indicated by the target video and the target region, reference may be made to FIG. 4. FIG. 4 is a schematic diagram of a media content placement scenario according to an embodiment of this application. FIG. 4 includes a region A1 indicated by the target video, target corners A2, A3, A4, and A5, and a target region A6. Specifically, the region A1 indicated by the target video may be a video playback page, the target region A6 is an advertising position, and the target corners A2, A3, A4, and A5 are intersections of boundaries of the advertising position. It may be understood that the quantity of corners and the shape of the region indicated by the target video in this embodiment are only examples, and the specific quantity and shape depend on the actual scenario.

In combination with the description of outputting the image recognition result based on the first model in the foregoing step 302, the image recognition process and the corner determination process may be combined, that is, a target identifier outputted by the first model is determined. The target identifier is used for indicating a scope of a pending region. If the target identifier is within the range formed by the connecting lines of the target corners, the pending region is determined as the target region.

After the target region is obtained, taking into account the adaptability of the first media content and the target video, relevant hue parameters of the first media content or the target video may be adjusted. Specifically, the first media content and the target video may be adjusted to the same hue value, or hue conversion may be performed based on the first media content or the target video.

In step 304, the media content placement method can place the first media content into the target region. In this embodiment, when the computer device places the first media content into the target region, the first media content may be transformed in a specific proportion based on the target region. For example, when the size of the target region is 10*10, and the size of the first media content is 20*20, the first media content is reduced by 1 time to 10*10 and then placed into the target region.

Optionally, the target region in the target video may not have a regular shape, for example, the target region is deformed due to a perspective change, and the first media content is often set based on a preset shape. In this case, to ensure the smooth placement of the first media content, the first media content may be adaptively cropped or transformed to meet the placement requirements of the target region.

As can be known from the foregoing embodiment, a target video and first media content are obtained, video frames of the target video are inputted into a first model for corner tracking, to obtain a plurality of target corners, the first model including a corner branch and an image branch, the corner branch being configured for determining candidate corners in the video frames, and the image branch being configured for extracting the target corners from the candidate corners; a target region in the video frames is determined according to the target corners; and the first media content is then placed into the target region. In this way, the automatic placement of the media content is realized. In the foregoing method, the target corners in the video frames are first determined by using the first model, and the target region for placing the media content is then accurately determined in the video frames based on the target corners determined by the first model, thereby ensuring the accuracy of media content placement. In addition, the whole process does not require manual replacement, which improves the efficiency of media content placement.

Figure 5:
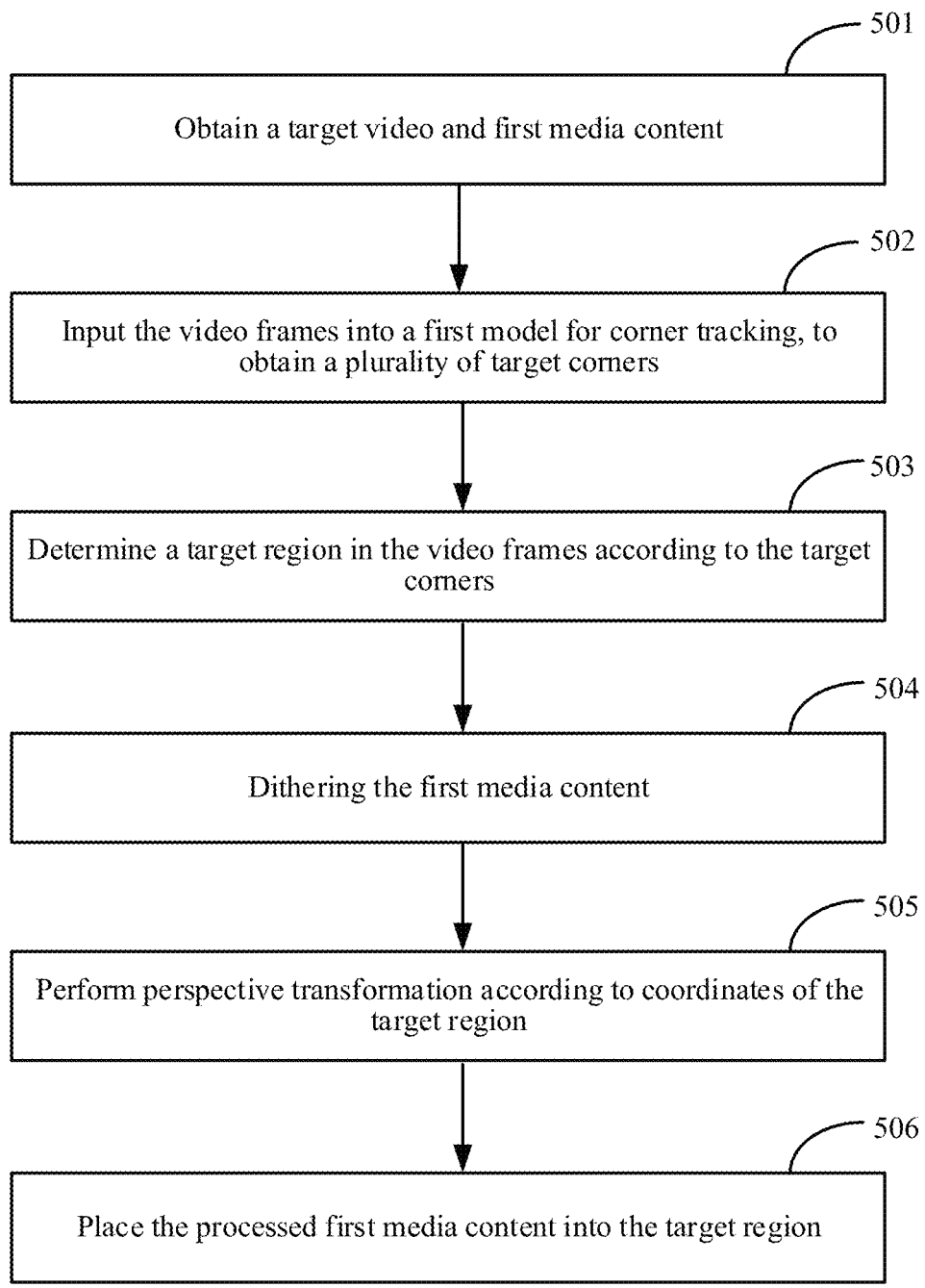
FIG. 5 is a flowchart of a media content placement method according to an embodiment of this application.

The foregoing embodiment describes the media content placement process. However, the target video may be deformed or changed in hue in some scenarios. Therefore, to ensure the accuracy of media content insertion, the media content may be further adjusted in combination with relevant parameters of the target video. The scenario is described below. FIG. 5 is a flowchart of a media content placement method according to an embodiment of this application. This embodiment of this application includes at least the following steps:

In step 501, the media content placement method can obtain a target video and first media content.

In step 502, the media content placement method can input the video frames of the target video into a first model for corner tracking, to obtain a plurality of target corners.

In step 503, the media content placement method can determine a target region in the video frames according to the target corners.

In this embodiment, steps 501 to 503 are similar to steps 301 to 303 in the embodiment shown in FIG. 3, and relevant feature descriptions may be referred to, and are not repeated herein.

In step 504, the media content placement method can dither the first media content. In this embodiment, dithering is a process of image processing based on a second model, where the second model may be a VGG19 model, which is configured to obtain a difference in hue parameters between the first media content and the target video. Specifically, the first media content may be inputted into a second model to obtain dithering information. The dithering information includes at least one of the following parameters: a hue parameter, a texture parameter, or a material parameter. The second model is obtained through training based on display parameters of the first media content and the target video under a plurality of resolutions. The first media content is then adjusted according to the dithering information, that is, parameter adjustment is performed on the first media content with reference to a difference of the hue parameter, the texture parameter, or the material parameter indicated in the dithering information.

It may be understood that the dithering process may be performed immediately after the first media content is obtained, or may be performed after the first media content is placed into the target region. The specific sequence depends on the actual scenario and is not limited herein.

Figure 6:
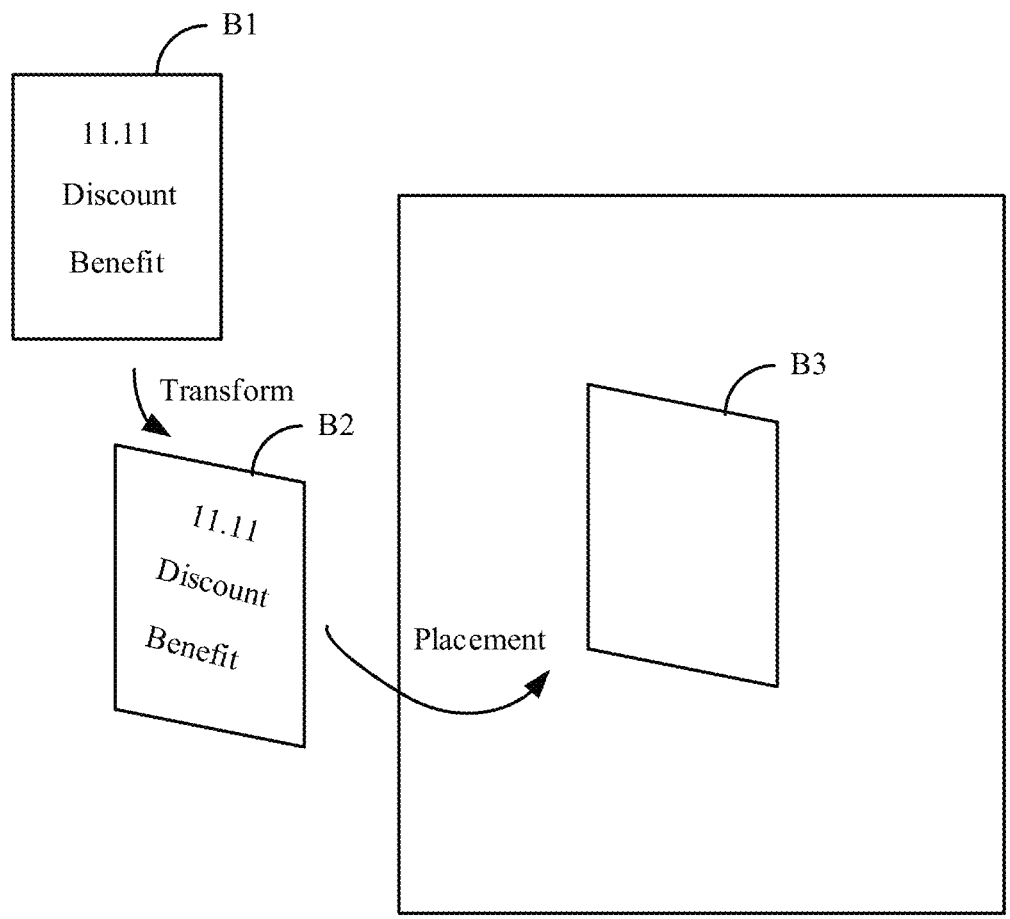
FIG. 6 is a schematic diagram of a perspective transformation scenario according to an embodiment of this application.

In step 505, the media content placement method can perform perspective transformation according to coordinates of the target region. In this embodiment, for the process of perspective transformation, reference may be made to FIG. 6. FIG. 6 is a schematic diagram of a perspective transformation scenario according to an embodiment of this application. As can be seen, shape transformation is first performed on first media content B1 according to the shape of the target region, and transformed first media content B2 is then placed into a target region B3.

Optionally, the process of determining the shape of the target region may be performed based on coordinates of the target corners. Coordinate information of the target corners is first obtained; a perspective transformation matrix is then determined according to the coordinate information; and perspective transformation processing is performed on the first media content based on the perspective transformation matrix, that is, the perspective transformation matrix and the first media content are entered into a perspective transformation formula, to obtain second media content. The specific perspective transformation formula may refer to the following formula:

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix},$$

where $[x', y', w']$ are coordinates of a region indicated by the second media content, $x'$ is a three-dimensional spatial abscissa of the region indicated by the second media content, $y'$ is a three-dimensional spatial ordinate of the region indicated by the second media content, $w'$ is a three-dimensional spatial vertical coordinate of the region indicated by the second media content; and $[u, v, w]$ are coordinates of a region indicated by the first media content, $u$ is a three-dimensional spatial abscissa of the region indicated by the first media content, $v$ is a three-dimensional spatial ordinate of the region indicated by the first media content, $w$ is a three-dimensional spatial vertical coordinate of the region indicated by the first media content. In this embodiment, the coordinates of the target region of the perspective transformation are coordinates in a two-dimensional space. Therefore, the three-dimensional coordinates of the foregoing formula may be converted into two-dimensional coordinates.

Specifically, $(u, v)$ are an abscissa and an ordinate of the region indicated by the first media content, and $(x', y')$ are an abscissa and an ordinate of the region indicated by the second media content, where $x'=x/w$, $y'=y/w$, that is, the conversion of two-dimensional coordinates is performed.

Correspondingly, the mathematical expression of the perspective transformation matrix is:

$$x = \frac{X'}{W'} = \frac{a_{11}u + a_{21}V + a_{31}}{a_{13}u + a_{23}V + a_{33}}$$

$$y = \frac{y'}{W'} = \frac{a_{12}u + a_{22}V + a_{32}}{a_{13}u + a_{23}V + a_{33}},$$

where u is the abscissa of the region indicated by the first media content; v is the ordinate of the region indicated by the first media content; x' is the abscissa of the region indicated by the second media content; y' is the ordinate of the region indicated by the second media content; w' is the three-dimensional spatial vertical coordinate of the region indicated by the second media content; and a11, a12, a13, a21, a22, a23, a31, a32, and a33 are parameters in the transformation matrix.

That is, the perspective transformation matrix may be obtained according to the corresponding coordinates after the perspective transformation of the corners, for example, the four corners of the advertising material.

The second media content obtained after the foregoing perspective transformation is the media content that needs to be placed into the target region.

In step 506, the media content placement method can place the processed first media content into the target region. In this embodiment, the processed first media content may be dithered, perspective-transformed, or may be both dithered and perspective-transformed. The specific processing procedure depends on the actual scenario. Since there may be blurred boundaries in the processed first media content, anti-aliasing may be further performed on the placed boundary lines to obtain a final placement result.

As can be seen with reference to the foregoing embodiments, the first media content after dithering and perspective transformation can be better adapted to the scenario after being placed into the target region, thereby avoiding placement defects caused by color difference or viewing angle, and improving the accuracy of media content placement.

Figure 7:
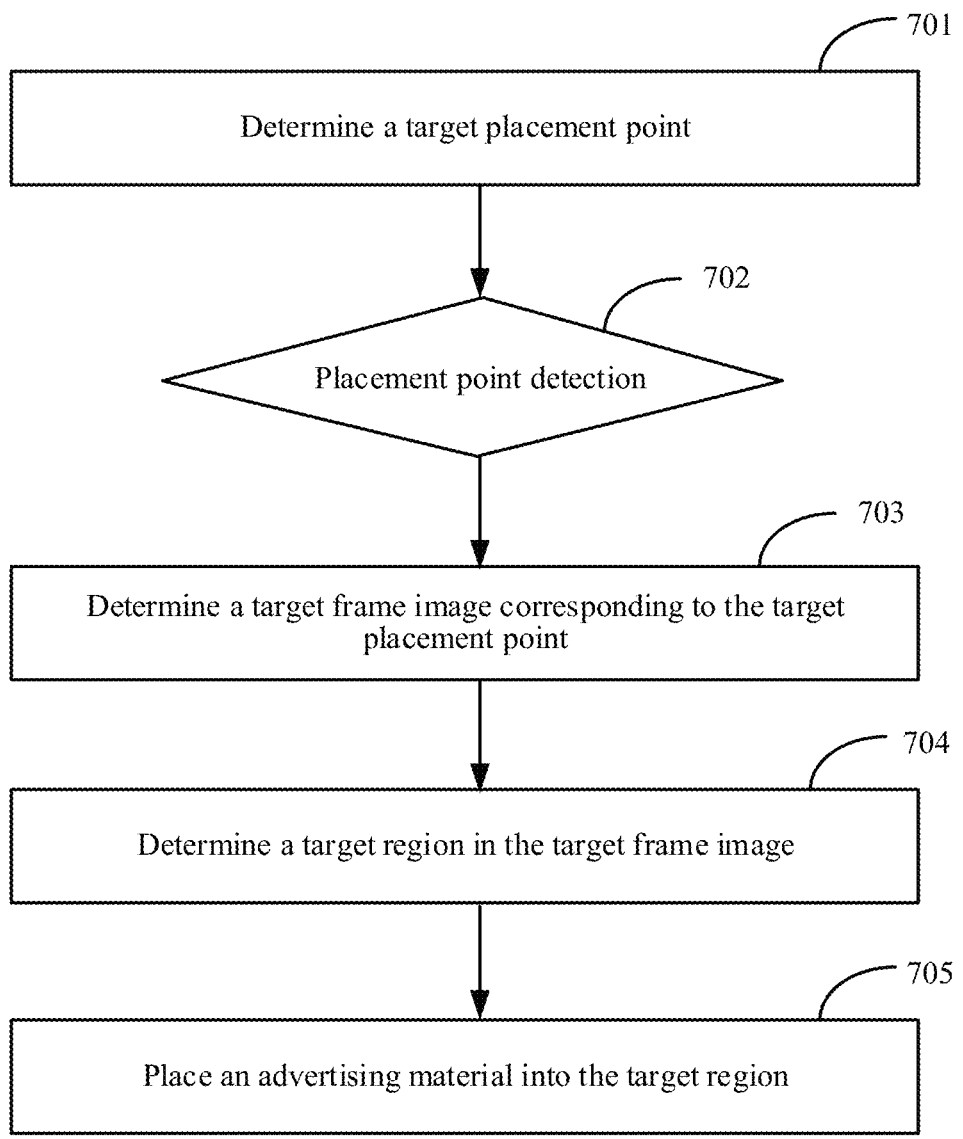
FIG. 7 is a flowchart of a media content placement method according to an embodiment of this application.

Through the description of the foregoing embodiments, the media content can be more accurately placed into the target video. In some possible scenarios, the target video may be a video being played. A description is made below with reference to a specific scenario of advertising placement. FIG. 7 is a flowchart of a media content placement method according to an embodiment of this application. This embodiment of this application includes at least the following steps:

In step 701, the media content placement method can determine a target placement point. In this embodiment, since the target video is the video being played, the target placement point needs to be specified in the placement process, that is, a video frame as the placement point is determined. The target video may be a video played through a player application, or a live video on a TV.

In step 702, the media content placement method can perform placement point detection. In this embodiment, the placement point detection process may be the determination of a time sequence. For example, the placement point appears at 10 minutes and 2 seconds, that is, the advertisement needs to be played after the time point. In this case, the video playback may be stopped, and the first media content is placed into the target region.

Figure 8:
FIG. 8 is a schematic diagram of a media content insertion scenario according to an embodiment of this application.

In step 703, the media content placement method can determine a target frame image corresponding to the target placement point. In this embodiment, the target frame image is an image of a frame in the target video, and the advertising material may be a dynamic picture, a video, or web page information with an input function. FIG. 8 is a schematic diagram of a media content insertion scenario according to an embodiment of this application, that is, an advertising material shown in the figure is inserted into a target region C1 of the target frame image. Specifically, the advertising material may be inserted by aligning corners of the advertising material with corners of the target region C1, or the advertising material may be reduced by a specific percentage based on the corners of the target region C1 and then inserted. The specific insertion method depends on the actual scenario.

In step 704, the media content placement method can determine a target region in the target frame image. In this embodiment, the target region may refer to the display in FIG. 8, that is, a region indicated by an advertising position.

Figure 9:
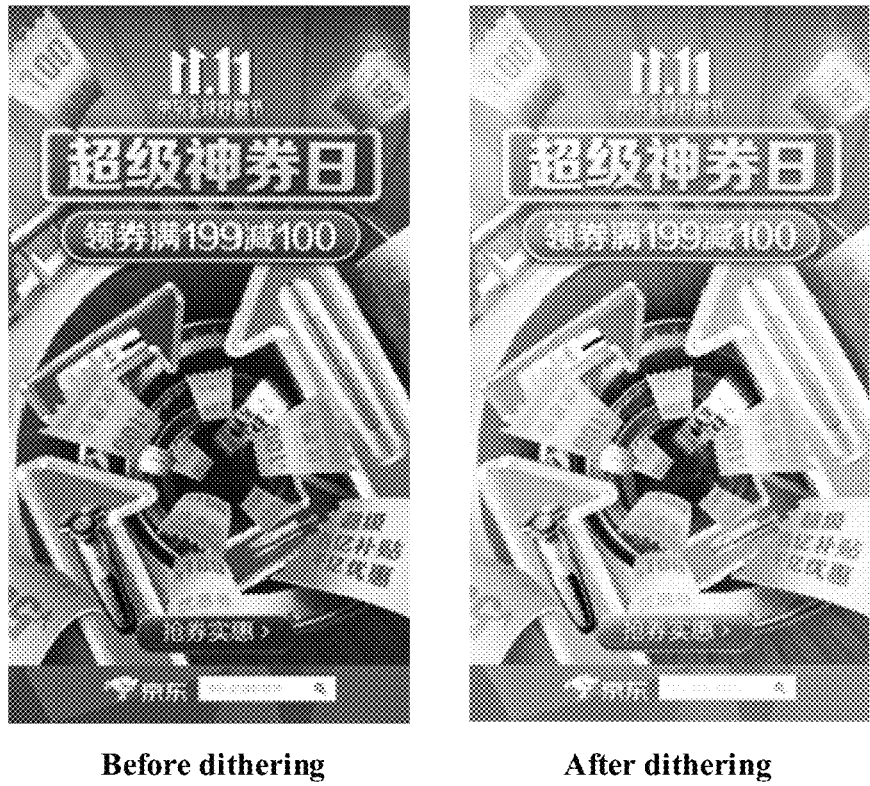
FIG. 9 is a schematic diagram of a media content insertion scenario according to an embodiment of this application.

In step 705, the media content placement method can place an advertising material into the target region. In this embodiment, the target frame image is equivalent to the video frame used during processing of the target video in the foregoing embodiments shown in FIG. 3 and FIG. 5. A hue parameter of the advertising material is changed after dithering of the advertising material. FIG. 9 is a schematic diagram of a media content insertion scenario according to an embodiment of this application. The hue of the picture is darker before the dithering, and the hue of the picture is brighter after the dithering. This is because the overall hue of the target frame image is brighter. Dithering may adjust the hue of the advertising material by adapting to the hue parameters of the advertising material and the target frame image.

Figure 10:
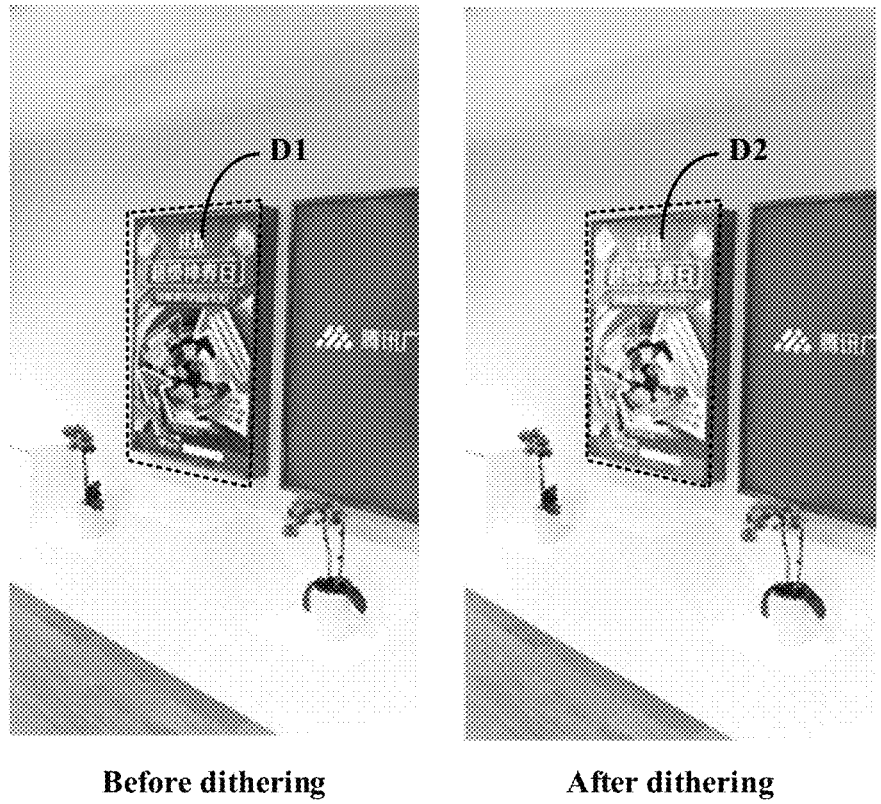
FIG. 10 is a schematic diagram of a media content insertion scenario according to an embodiment of this application.

Perspective transformation processing is further performed, and the specific process may refer to the relevant description of step 505 in the embodiment shown in FIG. 5. As can be seen with reference to FIG. 10, the advertising material after the dithering and the perspective transformation processing is closer to the ambient hue in the video, and the display is more natural. FIG. 10 is a schematic diagram of a media content insertion scenario according to an embodiment of this application. A target interface D1 before the dithering has not undergone perspective transformation, that is, the shape of the target interface D1 is not the same as the advertising material shown in FIG. 8, and the advertising material after perspective transformation is more suitable for the scene in the target video. Further, a hue of a target interface D2 obtained through dithering is more suitable for the hue of the target video, which makes the placement of the advertising material more natural. The comparison results shown in FIG. 8 to FIG. 10 above are only for illustration. The specific sequence of perspective transformation and dithering may be to perform perspective transformation first and then perform dithering on the advertising material; or perform dithering first and then perform perspective transformation; or perform dithering and perspective transformation simultaneously.

The processing after the placement of the advertising material may be to stop the playback of the video and continue playing after the advertising material is played, or may be to play the video and the advertising material simultaneously, where the advertising material is placed on top of the image layer of the video. The placement point is detected to trigger the advertisement placement process, so that the advertising material can be easily inserted into the video content, avoiding the trouble and instability of frame-by-frame processing in advance, and improving the efficiency and accuracy of advertisement placement.

Figure 11:
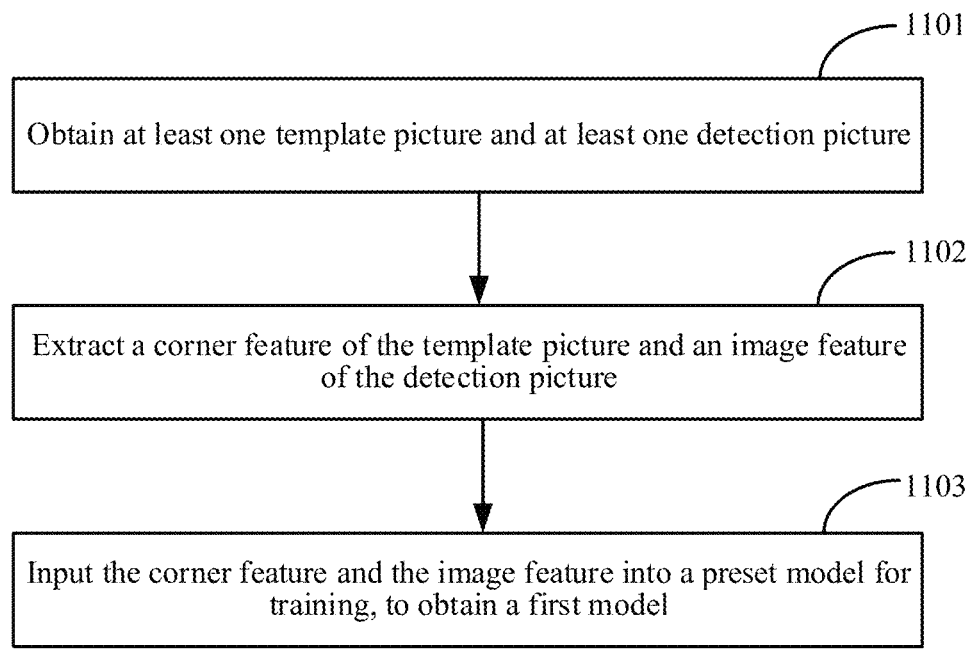
FIG. 11 is a flowchart of a model training method according to an embodiment of this application.

The foregoing embodiment describes the media content placement method. During the placement, the first model is used to determine the target corners, and the first model is pre-trained. The training process of the first model is described below. FIG. 11 is a flowchart of a model training method according to an embodiment of this application. This embodiment of this application includes at least the following steps:

In step 1101, the model training method can obtain at least one template picture and at least one detection picture. In this embodiment, the template picture is related to a picture indicated by the target video, and the detection picture is related to a picture indicated by the target region. To ensure the consistency of model training, the template picture and the detection picture may be processed according to preset size information, to obtain a size adjustment parameter, the template picture and the detection picture are then adjusted according to the size adjustment parameter, that is, the template picture and the detection picture are adjusted to the same size.

In addition, for the foregoing size adjustment process, there may be a case that some images cannot completely correspond. In this case, vacant parts may be filled with color numbers. Specifically, an adjustment region is determined first according to the size adjustment parameter; an average color value of the template picture and the detection picture is then obtained; and the adjustment region is filled according to the average color value, to obtain the adjusted template picture and the adjusted detection picture.

In step 1102, the model training method can extract a corner feature of the template picture and an image feature of the detection picture. In this embodiment, the process of extracting the corner feature is to extract a correspondence between a plurality of corners and a corresponding interface; and the process of extracting the image feature is to extract a picture feature of the target region and a corresponding picture.

In step 1103, the model training method can train a preset model based on the corner feature and the image feature, to obtain the first model. In this embodiment, the first model and the preset model may be determined based on a Siamese network model, that is, a network model used for target tracking. Since the preset model may include two branches, a residual network model may be trained based on the corner feature, to obtain the corner branch; a feature extraction network model may be trained based on the image feature, to obtain the image branch; and the preset model may be trained according to the corner branch and the image branch, to obtain the first model.

Figure 12:
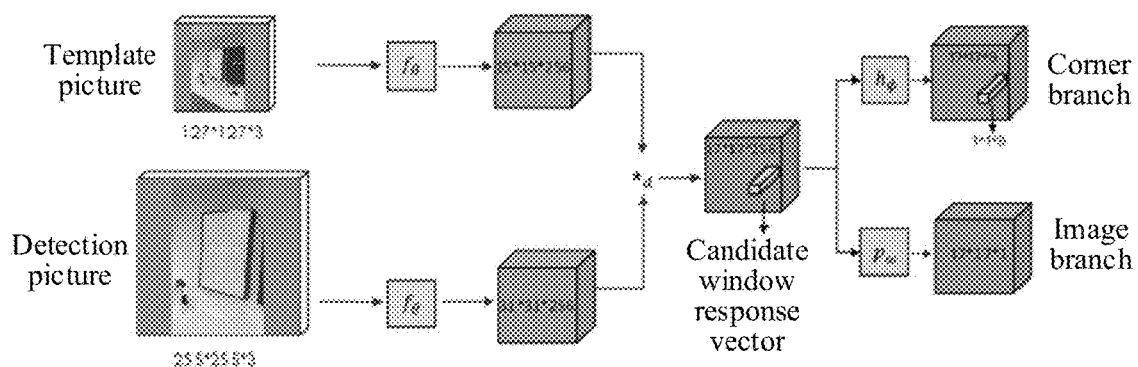
FIG. 12 is a model architectural diagram of model training according to an embodiment of this application.

Specifically, a network model architecture of the preset model may be seen in FIG. 12. FIG. 12 is a model architectural diagram of model training according to an embodiment of this application. The branch in the upper part shown in FIG. 12 is configured for processing the template picture, that is, the branch corresponds to the corner branch, is configured for tracking the position of the target corners, and has a size of 127*127*3. After the template picture passes through a feature extraction network $f_\theta$, a feature map with a size of 15*15*256 is obtained, where $f_\theta$ is the first four stages of the residual network resnet-50. For specific parameters, reference may be made to the description of step 302 in the embodiment of FIG. 3, and the details are not repeated herein. The branch in the lower part shown in FIG. 12 is configured for processing the entire picture to be searched (that is, the detection picture), that is, the branch corresponds to the image branch, and has a size of 255*255*3. After the detection picture passes through the same feature extraction network $f_\theta$, a feature map with a size of 31*31*256 is obtained. The feature map of the template picture is then used as a convolution kernel to perform a *d cross-correlation operation on the feature map of the detection picture, to obtain a response map of 17*17*256. 1*1*256 at each position in the response map is referred to as a candidate window response row. Further, the row is then outputted through the corner branch and the score branch of 1×1 branch encoding. For the convolution parameters of the specific encoding process, reference may be made to Table 1 in the embodiment of FIG. 3, and the details are not repeated herein. Each row vector of the corner branch represents a plurality of corners, such as four corners, which are the horizontal and vertical coordinates of the upper left corner, the upper right corner, the lower left corner, or the lower right corner of the bounding box respectively. Since each corner is represented by an abscissa and an ordinate, the size of the row vector is 1*1*(2*4), that is, 1*1*8. The output of the score branch indicates whether the position where the row vector is mapped to the detected image includes a target identifier, and the value is ±1, that is, used for determining whether the target region includes an image feature of the advertising position.

Optionally, since the model architecture of the foregoing preset model is designed with the transformation of a plurality of variables, a loss function thereof also needs to be transformed correspondingly. Specifically, a first loss function in the corner branch and a second loss function in the image branch are first obtained, the first loss function being determined based on a quantity of corners in the template picture; a third loss function is determined according to the first loss function and the second loss function, the third loss function being obtained through weight merge based on the first loss function and the second loss function; and parameter adjustment is then performed on the preset model by minimizing the third loss function, to obtain the first model.

In a possible scenario, the loss function of the corner branch is as follows:

$$L_{corner} = \frac{1}{N} \sum_{i=0}^{N} \text{smooth}_{L1}(\delta_i, \hat{\delta}_i),$$

where $\delta[i]$ and $\hat{\delta}[i]$ respectively represent a true value and a predicted value of coordinates of the position of the corners. i=(0,1) represents horizontal and vertical coordinates (x, y) of a first corner, and there are N/2 corners and N coordinate values in total, N being a quantity of corners.

In addition, the mathematical expression of the smooth L1 loss function is:

$$\text{smooth}_{L_1}(x, \sigma) = \begin{cases} 0.5\sigma^2 x^2, & |x| < \frac{1}{\sigma^2} \\ |x| - \frac{1}{2\sigma^2}, & |x| \geq \frac{1}{\sigma^2} \end{cases}$$

With reference to the foregoing expression, the total loss function is as follows:

$$\mathcal{L} = \lambda_1 \cdot \mathcal{L}_{corner} + \lambda_2 \cdot \mathcal{L}_{score}$$

where $\lambda_1$ and $\lambda_2$ respectively represent weights of the loss functions of the corner branch and the score branch, $\mathcal{L}_{corner}$ represents the loss function of the corner branch, and $\mathcal{L}_{score}$ represents the loss function of the score branch.

The relevant parameters of the preset model may be adjusted by minimizing, to obtain the first model.

Figure 13:
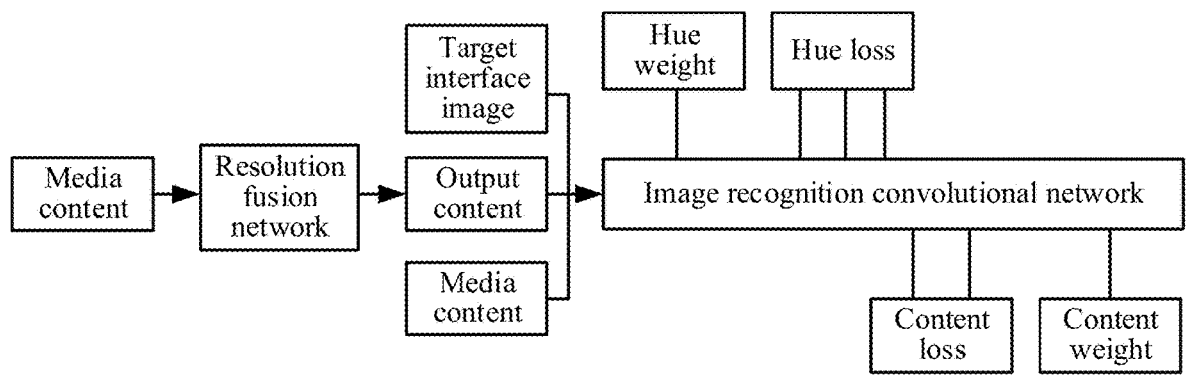
FIG. 13 is a schematic diagram of a model training method according to an embodiment of this application.

In addition, the dithering process in this embodiment of this application may be alternatively performed based on the training process of the VGG19 model. The following describes the training process of the VGG19 model. FIG. 13 is a schematic diagram of a model training method according to an embodiment of this application. First, the media content is inputted into a resolution fusion network to generate the media content after dithering, that is, the output content. The resolution fusion network uses multi-resolution feature concatenation, and each layer of fusion network includes information at a plurality of resolutions.

The output content, the media content, and a target video image are then inputted into the VGG19 model, that is, an image recognition convolutional network, for feature extraction. Specifically, the VGG19 model pre-trained on ImageNet is used to extract different network feature layers to represent hue information and content information. The network model loss is then calculated. The loss mainly includes hue loss and content loss of an output image after dithering and any frame image of the video, and combined with a preset weight ratio, difference information of different images is further obtained. The model parameters are then continuously trained and updated by minimizing the loss function to obtain a final image dithering model.

It may be understood that the weight ratio of the hue loss and the content loss may be preset or automatically generated based on historical weight records of a target scenario, and the specific setting method depends on the specific scenario.

Figure 14:
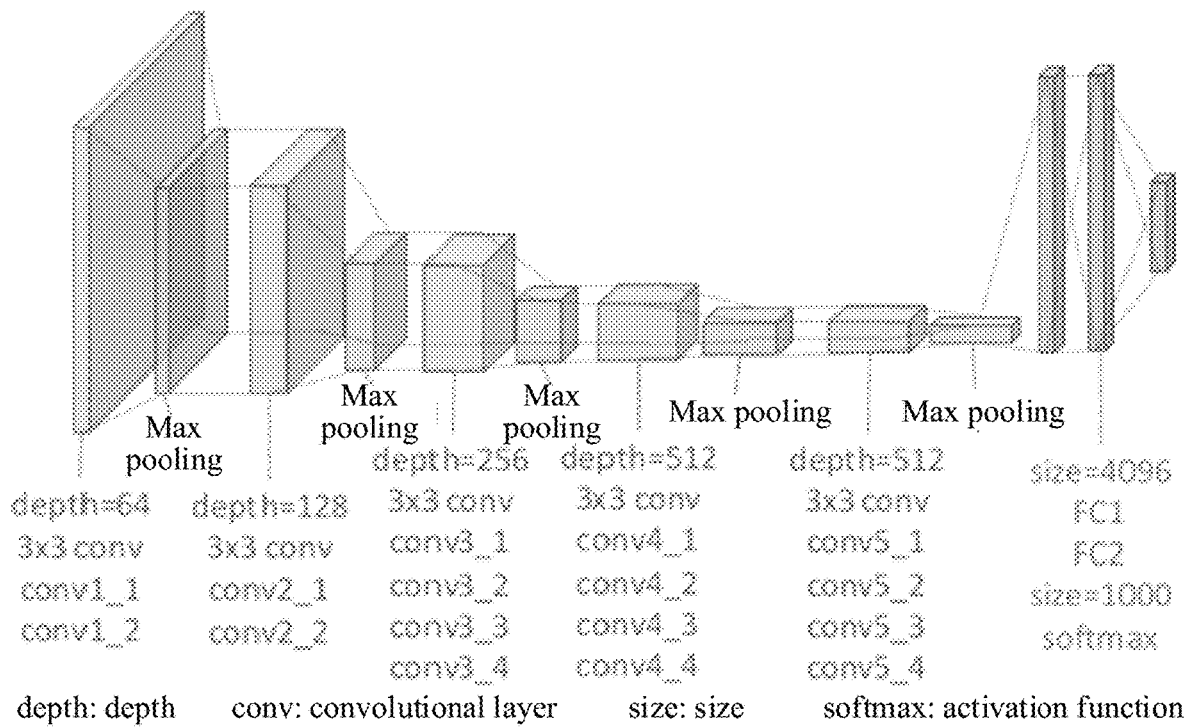
FIG. 14 is a model architectural diagram of model training according to an embodiment of this application.

The foregoing embodiment describes the function process of VGG19. The following describes the network structure diagram of VGG19. FIG. 14 is a model architectural diagram of model training according to an embodiment of this application.

First, through the VGG19 model pre-trained on ImageNet, image features such as hue, texture, material, and edge can be well extracted. Corresponding to the foregoing model training process, the content loss is expressed as a sum of features of a "conv5_1" layer and a "conv4_2" layer extracted from VGG19. This is because the "conv5_1" layer and the "conv4_2" layer can represent image structure information at different granularities, and the addition of feature values of the two layers can contain richer image structure information. In addition, the hue loss is expressed as a sum of Gram matrix features of "conv1_2", "conv2_2", and "conv3_2" extracted from VGG19, which mainly includes color information of the video frame image. This is because the value of conv2_2 is larger than that of other layers. Therefore, a weight ratio of 0.5 is given to conv2_2, to prevent the hue information represented by conv2_2 from being too large.

Through the training process of the VGG19 model, the trained VGG19 model can accurately output relevant hue adjustment parameters, which facilitates the dithering process and further improves the accuracy of media content placement.

Figure 15:
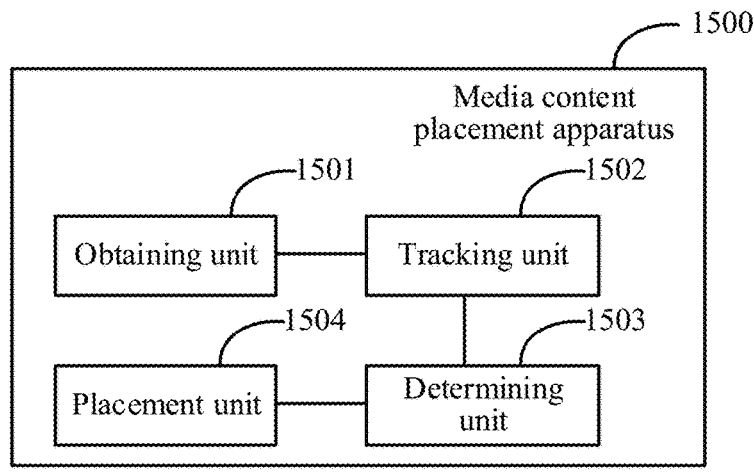
FIG. 15 is a schematic structural diagram of a media content placement apparatus according to an embodiment of this application.

To better implement the foregoing solutions in the embodiments of this application, the following further provides a related apparatus configured to implement the foregoing solutions. FIG. 15 is a schematic structural diagram of a media content placement apparatus according to an embodiment of this application.

As shown, the media content placement apparatus 1500 can included an obtaining unit 1501, configured to obtain a target video and first media content, the target video including a plurality of video frames. The media content placement apparatus 1500 can also include a tracking unit 1502, configured to input the video frames into a first model for corner tracking, to obtain a plurality of target corners, the first model including a corner branch and an image branch, the corner branch being configured for determining candidate corners in the video frames, and the image branch being configured for extracting the target corners from the candidate corners. Further, the media content placement apparatus 1500 can include a determining unit 1503, configured to determine a target region in the video frames according to the target corners, and a placement unit 1504, configured to place the first media content into the target region. Of course, it should be understood that one or more of the units described in any of the exemplary embodiments of this disclosure can be implemented by hardware, such as processing circuitry, for example.

Optionally, in some possible implementations of this application, the determining unit 1503 is further configured to input the video frames into the first model, and determine the candidate corners in the video frames through the corner branch. The determining unit 1503 can be further configured to map the candidate corners to the video frames through the image branch, to obtain a candidate region, and the determining unit 1503 can be further configured to determine the plurality of target corners that satisfy a preset condition from the candidate corners, the preset condition being determined based on a correspondence between the candidate region and a preset region, the preset region being a media content placement region marked in the video frames.

In some possible implementations of this application, the determining unit 1503 is further configured to input the first media content into a second model to obtain dithering information, the dithering information including at least one of a hue parameter, a texture parameter, or a material parameter, and the second model being obtained through training based on display parameters of the first media content and the target video under a plurality of resolutions, and the placement unit 1504 is further configured to adjust the first media content according to the dithering information.

In some possible implementations of this application, the obtaining unit 1503 is further configured to obtain coordinate information of the target corners, and the determining unit 1503 is further configured to determine a perspective transformation matrix according to the coordinate information. Further, the determining unit 1503 can be further configured to perform perspective transformation processing on the first media content based on the perspective transformation matrix, to obtain second media content, and the placement unit 1504 is further configured to place the second media content into the target region.

In some possible implementations of this application, the determining unit 1503 is further configured to determine boundary information according to the target corners, and the determining unit 1503 is further configured to perform anti-aliasing on boundary lines corresponding to the boundary information, to obtain the target region.

In some possible implementations of this application, the obtaining unit 1501 is further configured to obtain a target placement point, the target placement point being used for indicating a video frame serving as a placement point in the target video, the placement unit 1504 is further configured to determine the target region in the corresponding video frame according to the target placement point, and the placement unit 1504 is further configured to place the first media content based on the target region.

A target video and first media content are obtained; video frames of the target video are inputted into a first model for corner tracking, to obtain a plurality of target corners, the first model including a corner branch and an image branch, the corner branch being configured for determining candidate corners in the video frames, and the image branch being configured for extracting the target corners from the candidate corners; a target region in the video frames is determined according to the target corners, the target region being included in a region indicated by the target video, and the first media content is then placed into the target region. In this way, the automatic placement of the media content is realized. In the foregoing method, the target corners in the video frames are first determined by using the first model, and the target region for placing the media content is then accurately determined in the video frames based on the target corners determined by the first model, thereby ensuring the accuracy of media content placement. In addition, the whole process does not require manual replacement, which improves the efficiency of media content placement.

Figure 16:
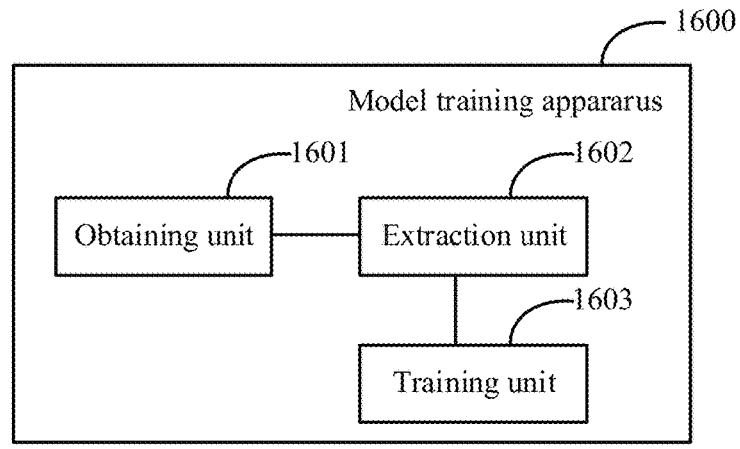
FIG. 16 is a schematic structural diagram of a model training apparatus according to an embodiment of this application.

An embodiment of this application further provides a model training apparatus 1600. FIG. 16 is a schematic structural diagram of a model training apparatus according to an embodiment of this application. The apparatus can include an obtaining unit 1601, configured to obtain at least one template picture and at least one detection picture, the template picture being related to a picture indicated by the target video, and the detection picture being related to a picture indicated by the target region, and an extraction unit 1602, configured to extract a corner feature of the template picture and an image feature of the detection picture. Further, the apparatus can include a training unit 1603, configured to train a preset model based on the corner feature and the image feature, to obtain the first model.

In some possible implementations of this application, the training unit 1603 is further configured to train a residual network model based on the corner feature, to obtain the corner branch. Further, the training unit 1603 can be further configured to train a feature extraction network model based on the image feature, to obtain the image branch, and the training unit 1603 is further configured to train the preset model according to the corner branch and the image branch, to obtain the first model.

In some possible implementations of this application, the training unit 1603 is further configured to obtain a first loss function in the corner branch and a second loss function in the image branch, the first loss function being determined based on a quantity of corners in the template picture. Additionally, the training unit 1603 can be further configured to determine a third loss function according to the first loss function and the second loss function, the third loss function being obtained through weight merge based on the first loss function and the second loss function, and the training unit 1603 is further configured to perform parameter adjustment on the preset model by minimizing the third loss function, to obtain the first model.

In other possible implementations of this application, the obtaining unit 1601 is further configured to process the template picture and the detection picture according to preset size information, to obtain a size adjustment parameter, and the obtaining unit 1601 is further configured to adjust the template picture and the detection picture according to the size adjustment parameter.

In alternative possible implementations of this application, the obtaining unit 1601 is further configured to determine an adjustment region according to the size adjustment parameter, the obtaining unit 1601 is further configured to obtain an average color value of the template picture and the detection picture, and the obtaining unit 1601 is further configured to fill the adjustment region according to the average color value, to obtain the adjusted template picture and the adjusted detection picture.

Figure 17:
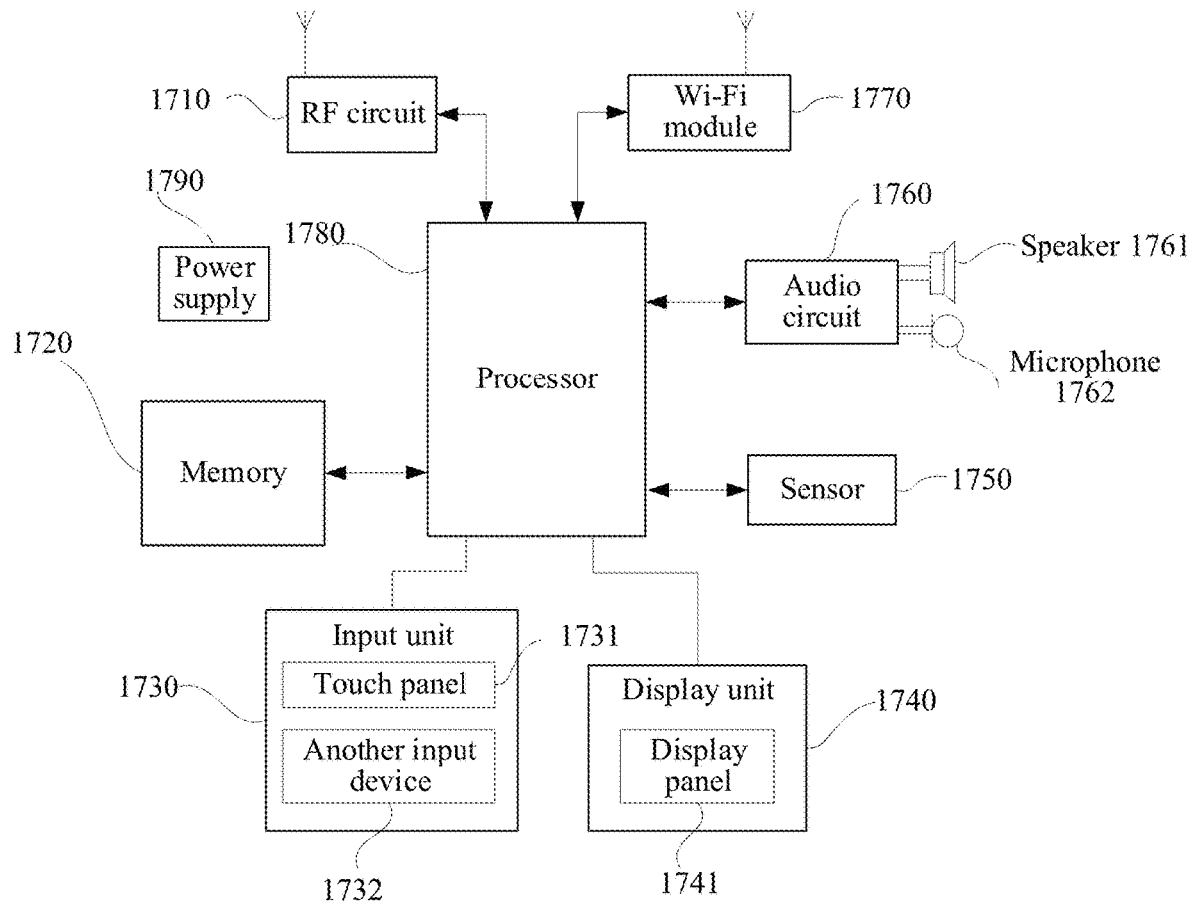
FIG. 17 is a schematic structural diagram of a computer device according to an embodiment of this application.

An embodiment of this application further provides a computer device. FIG. 17 is a schematic structural diagram of a computer device according to an embodiment of this application. For ease of description, only parts related to the embodiments of this application are shown. For specific technical details that are not disclosed, refer to the method part in the embodiments of this application. The terminal may be any computer device including a mobile phone, a tablet computer, a personal digital assistant (PDA), a point of sales (POS), and an on-board computer, and the terminal being a mobile phone is used as an example.

FIG. 17 is a block diagram of a part of a structure of a mobile phone related to the terminal according to an embodiment of this application. Referring to FIG. 17, the mobile phone includes components, such as a radio frequency (RF) circuit 1710, a memory 1720, an input unit 1730, a display unit 1740, a sensor 1750, an audio circuit 1760, a wireless fidelity (Wi-Fi) module 1770, a processor 1780, and a power supply 1790. A person skilled in the art can understand that the structure of the mobile phone shown in FIG. 17 does not constitute a limitation to the mobile phone, and the mobile phone may include more components or fewer components than those shown in the figure, or some components may be combined, or a different component deployment may be used.

In this embodiment of this application, the processor 1780 included in the terminal further has the function of performing the steps of the foregoing media content placement method.

Figure 18:
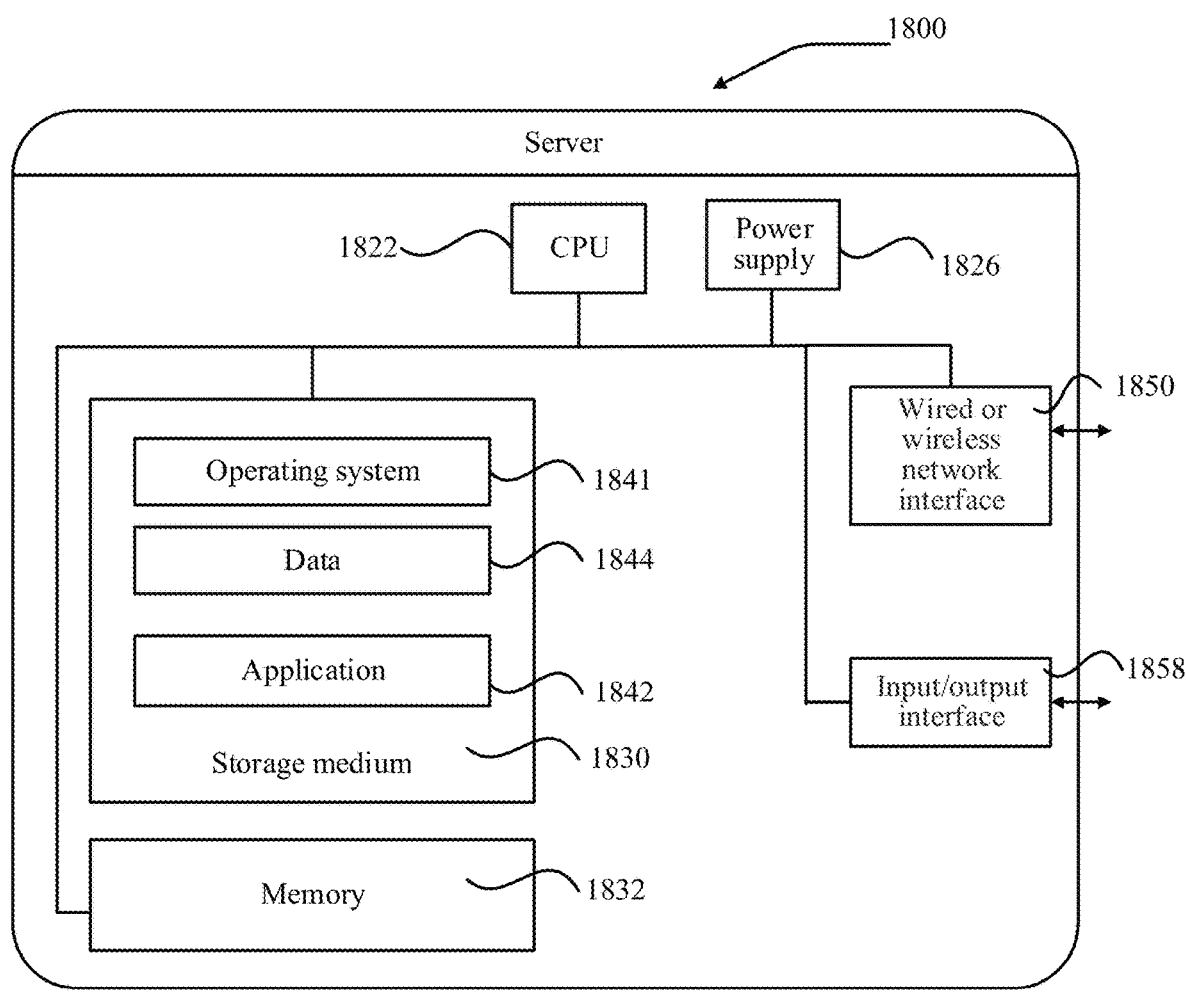
FIG. 18 is a schematic structural diagram of a server according to an embodiment of this application.

An embodiment of this application further provides a server. FIG. 18 is a schematic structural diagram of a server according to an embodiment of this application. The server 1800 greatly differs due to different configurations or performances. The server may include one or more central processing units (CPUs) 1822 (for example, one or more processors) and a memory 1832, one or more store applications 1842 or storage media 1830 of data 1844 (for example, one or more mass storage devices). The memory 1832 and the storage medium 1830 may implement transient storage or permanent storage. The programs stored in the storage media 1830 may include one or more modules (not shown in the figure), and each module may include a series of instructions to the server. Further, the CPU 1822 may be configured to communicate with the storage medium 1830, and perform, on the server 1800, the series of instruction operations in the storage medium 1830.

The server 1800 may further include one or more power supplies 1826, one or more wired or wireless network interfaces 1850, one or more input/output interfaces 1858, and/or one or more operating systems 1841 such as Windows Server™, Mac OS X™, Unix™, Linux™, and FreeBSD™.

The steps performed by the model training apparatus in the foregoing embodiments may be based on the server structure shown in FIG. 18.

An embodiment of this application further provides a non-transitory computer readable storage medium. The non-transitory computer readable storage medium stores a media content placement instruction. When the media content placement instruction runs on a computer, the computer is caused to perform the steps performed by the media content placement apparatus in the method described in the foregoing embodiments shown in FIG. 2 to FIG. 13.

An embodiment of this application further provides a computer program product including a media content placement instruction. When the media content placement instruction runs on a computer, the computer is caused to perform the steps performed by the media content placement apparatus in the method described in the foregoing embodiments shown in FIG. 2 to FIG. 13.

An embodiment of this application further provides a media content placement system, and the media content placement system may include the media content placement apparatus in the embodiment described in FIG. 14, or the model training apparatus described in FIG. 15.

What is claimed is:

1. A media content placement method, the method comprising:
   obtaining, by processing circuitry, a target video and first media content, the target video including a plurality of video frames;
   inputting, by processing circuitry, the video frames into a first model for corner tracking to obtain a plurality of target corners, the first model including a corner branch and an image branch, the corner branch being configured for determining candidate corners in the video frames based on a feature extraction network associated with the first model, and the image branch being configured for (i) obtaining a candidate region and (ii) extracting the target corners from the candidate corners based on a detected correspondence between the candidate region and a preset region, the preset region being indicated by a preset mark in the plurality of video frames and configured for media content placement;
   determining, by processing circuitry, a target region in the video frames based on the target corners;
   adjusting a shape and dithering information of the first media content to adapt to a shape and dithering information of the target region; and
   placing, by processing circuitry, the first media content into the target region.

2. The method according to claim 1, wherein the inputting the video frames into the first model further comprises:
   inputting the video frames into the first model and determining the candidate corners in the video frames through the corner branch;
   mapping the candidate corners to the video frames through the image branch to obtain the candidate region; and
   determining the plurality of target corners that satisfy a preset condition from the candidate corners, the preset condition being determined based on the correspondence between the candidate region and the preset region, the preset region being a media content placement region marked in the video frames.

3. The method according to claim 1, further comprising:
   inputting the first media content into a second model to obtain dithering information including at least one of a hue parameter, a texture parameter, or a material parameter, and the second model being obtained through training based on display parameters of the first media content and the target video under a plurality of resolutions; and
   adjusting the first media content based on the dithering information.

4. The method according to claim 1, further comprising:
   obtaining coordinate information of the target corners;
   determining a perspective transformation matrix based on the coordinate information; and
   performing perspective transformation processing on the first media content based on the perspective transformation matrix to obtain second media content,
   wherein the placing further includes placing the second media content into the target region.

5. The method according to claim 1, wherein the determining further comprises:
   determining boundary information according to the target corners; and
   performing anti-aliasing on boundary lines corresponding to the boundary information to obtain the target region.

6. The method according to claim 1, further comprising:
   obtaining a target placement point, the target placement point being used for indicating a video frame of the video frames, the video frame serving as a placement point in the target video,
   wherein the placing the first media content into the target region includes:
      determining the target region in the indicated video frame of the video frames based on the target placement point; and
      placing the first media content based on the target region.

7. The method according to claim 1, wherein the first media content is an advertisement, the target region is an advertising position, and the first model is a network model for target tracking.

8. The method according to claim 1, further comprising:
   training the first model, and
   wherein the training the first model comprises:
      obtaining a template picture and a detection picture, the template picture being related to a picture indicated by the target video, and the detection picture being related to a picture indicated by the target region;
      extracting a corner feature of the template picture and an image feature of the detection picture; and
      training a preset model based on the corner feature and the image feature to obtain the first model.

9. The method according to claim 8, wherein training the preset model based on the corner feature and the image feature further comprises:
   training a residual network model based on the corner feature to obtain the corner branch;
   training a feature extraction network model based on the image feature to obtain the image branch; and
   training the preset model based on the corner branch and the image branch to obtain the first model.

10. The method according to claim 9, wherein the training the preset model based on the corner branch and the image branch further comprises:
    obtaining a first loss function in the corner branch and a second loss function in the image branch, the first loss function being determined based on a quantity of corners in the template picture;
    determining a third loss function based on the first loss function and the second loss function, the third loss function being obtained through weight merge based on the first loss function and the second loss function; and
    performing parameter adjustment on the preset model by minimizing the third loss function to obtain the first model.

11. The method according to claim 8, wherein after the obtaining the template picture and the detection picture, the method further comprises:
    processing the template picture and the detection picture based on preset size information to obtain a size adjustment parameter; and adjusting the template picture and the detection picture based on the size adjustment parameter.

12. The method according to claim 11, wherein the adjusting the template picture and the detection picture according to the size adjustment parameter further comprises:
   determining an adjustment region based on the size adjustment parameter;
   obtaining an average color value of the template picture and the detection picture; and
   filling the adjustment region based on the average color value to obtain the adjusted template picture and the adjusted detection picture.

13. A media content placement apparatus, comprising:
   an obtaining circuit that is configured to obtain a target video and first media content, the target video including a plurality of video frames;
   a tracking circuit that is configured to input the video frames into a first model for corner tracking to obtain a plurality of target corners, the first model including a corner branch and an image branch, the corner branch being configured for determining candidate corners in the video frames based on a feature extraction network associated with the first model, and the image branch being configured for (i) obtaining a candidate region and (ii) extracting the target corners from the candidate corners based on a detected correspondence between the candidate region and a preset region, the preset region being indicated by a preset mark in the plurality of video frames and configured for media content placement;
   a determining circuit that is configured to determine a target region in the video frames based on the target corners and adjust a shape and dithering information of the first media content to adapt to a shape and dithering information of the target region; and
   a placement circuit that is configured to place the first media content into the target region.

14. A computer device, comprising:
   a processor; and
   a memory that is configured to store program code,
   wherein the processor executes instructions in the program code to perform the media content placement method according to claim 1.

15. A non-transitory computer-readable storage medium that stores instructions that, when run on a computer, cause the computer to perform a media content placement method comprising:
   obtaining a target video and first media content, the target video including a plurality of video frames;
   inputting the video frames into a first model for corner tracking to obtain a plurality of target corners, the first model including a corner branch and an image branch, the corner branch being configured for determining candidate corners in the video frames based on a feature extraction network associated with the first model, and the image branch being configured for (i) obtaining a candidate region and (ii) extracting the target corners from the candidate corners based on a detected correspondence between the candidate region and a preset region, the preset region being indicated by a preset mark in the plurality of video frames and configured for media content placement;
   determining a target region in the video frames based on the target corners;
   adjusting a shape and dithering information of the first media content to adapt to a shape and dithering information of the target region; and
   placing the first media content into the target region.

16. The non-transitory computer-readable storage medium according to claim 15, wherein the inputting the video frames into the first model further comprises:
   inputting the video frames into the first model and determining the candidate corners in the video frames through the corner branch;
   mapping the candidate corners to the video frames through the image branch to obtain the candidate region; and
   determining the plurality of target corners that satisfy a preset condition from the candidate corners, the preset condition being determined based on the correspondence between the candidate region and the preset region, the preset region being a media content placement region marked in the video frames.

17. The non-transitory computer-readable storage medium according to claim 15, wherein the computer further performs operations comprising:
   inputting the first media content into a second model to obtain dithering information including at least one of a hue parameter, a texture parameter, or a material parameter, and the second model being obtained through training based on display parameters of the first media content and the target video under a plurality of resolutions; and
   adjusting the first media content based on the dithering information.

18. The non-transitory computer-readable storage medium according to claim 15, wherein the computer further performs operations comprising:
   obtaining coordinate information of the target corners;
   determining a perspective transformation matrix based on the coordinate information; and
   performing perspective transformation processing on the first media content based on the perspective transformation matrix to obtain second media content,
   wherein the placing further includes placing the second media content into the target region.

19. The non-transitory computer-readable storage medium according to claim 15, wherein the determining further comprises:
   determining boundary information according to the target corners; and
   performing anti-aliasing on boundary lines corresponding to the boundary information to obtain the target region.

20. The non-transitory computer-readable storage medium according to claim 15, wherein the first media content is an advertisement, the target region is an advertising position, and the first model is a network model for target tracking.

* * * * *